June 29, 1926.
F. G. STILL
1,590,331
PULLEY WITH BUSHING
Filed Dec. 1, 1924
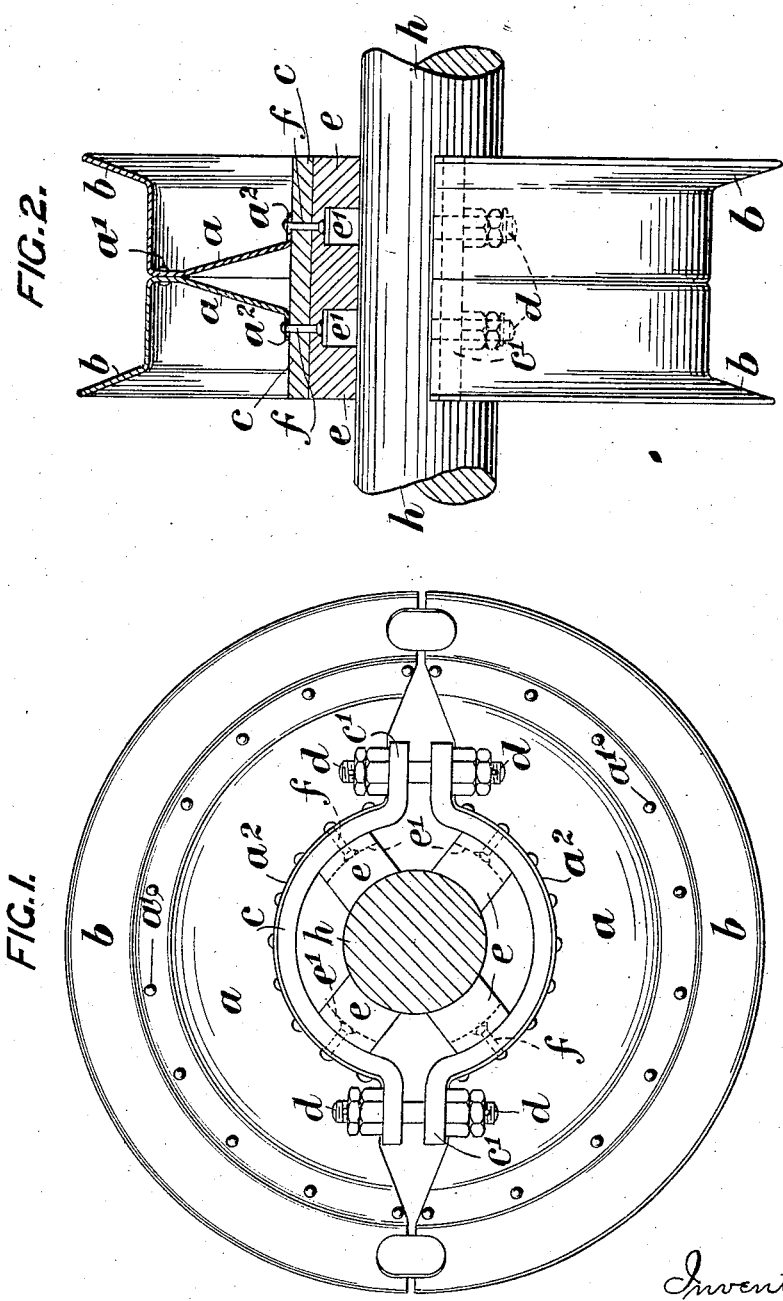

Patented June 29, 1926.

1,590,331

UNITED STATES PATENT OFFICE.

FREDERICK GUY STILL, OF LONDON, ENGLAND, ASSIGNOR TO J. STONE & COMPANY LIMITED, OF DEPTFORD, ENGLAND, A BRITISH COMPANY.

PULLEY WITH BUSHING.

Application filed December 1, 1924, Serial No. 753,213, and in Great Britain September 17, 1924.

This invention relates to an improved pulley with bushing and is particularly concerned with pressed steel pulleys. In manufacturing these pulleys for the engineering market, bushings have been fitted having a construction intended for enabling the pulleys to be fixed upon shafts or axles of different diameters. For example, in connection with dynamo belt pulleys for the axles of railway vehicles, such axles may vary in diameter and some may be tapered and others not. Nevertheless, the pulleys are required to be adapted for fixing on any of these axles and with such a reliable grip as to avoid possibility of slipping or looseness. In attempts to enable this to be done, corrugated sheet metal bushings have been supplied with the pulleys, the idea being that these bushings would compress sufficiently, in the case of an oversize axle, for enabling the desired grip to be obtained. In practice, however, it is found that there is a narrow limit to the compressibility of such bushings if they are to retain their gripping function and that, in the case of tapering axles, they are quite unsuitable for their purpose. Compressible bushings, particularly those of wood and the like, are also unsuitable and fail to give the required grip and adaptability when applied to axles differing appreciably from the standard axle for which these bushings may be designed.

One object of the present invention is to provide a divided pulley with hub means comprising bushing blocks adapted for being fitted or machined and fitted, on to an axle of any size or formation met with in practice.

A further object is to enable the fitting of a divided pulley on to axles of different diameters and formations to be accomplished in a short space of time and without exercise of skill.

A further object of the invention is to provide a divided pressed steel pulley with strap or hub sleeve members having adaptable bushing blocks secured therein and adapted for fitting with secure grip to axles of various diameters or formations.

These and other objects of the invention will be fully described with reference to the accompanying drawing, illustrating one advantageous example of a practical construction, in which drawing:—

Figure 1 is a side elevation of a divided pressed steel pulley fitted with the improved bushing and applied to an axle seen in cross section.

Figure 2 is partly an elevation looking on to the rim of the pulley seen in Figure 1 and partly a central cross section of Figure 1.

Referring to the drawing, the divided pressed steel pulley comprises the divergent half discs $a$ and rim parts $b$ formed by pressing, the half discs being riveted together at $a'$ near to the rim in the usual manner. The inner peripheral flanged edges $a^2$ of each pair of half discs are riveted to a semi-circular strap or semi-cylindrical sleeve member $c$ having redial extensions $c'$ at each end for serving as lugs for the bolts $d$ employed in bolting the two halves of the pulley together. Two set of cast iron blocks $e$ having convex outer surfaces are provided for each pulley half and are secured to the interior of the strap or sleeve member $c$ at little more than ninety degrees apart by the rivets $f$ which also serve for riveting the edges $a^2$ of the discs $a$ to the hub strap or sleeve member $c$. In the example illustrated, each block $e$ is formed with two recesses $e'$ in its inner face and the rivets $f$ pass through the bottoms of the recesses $e'$ and so retain the blocks $e$ in position whilst at the same time riveting the strap or sleeve member $c$ to the half discs $a$. The inner faces of the blocks $e$ are machined with a concavity corresponding with the diameter of an axle of minimum diameter.

In mounting the pulley illustrated in the drawing, the halves are applied from opposite sides of the axle $h$, the bolts $d$ are inserted through perforations in the lugs $c'$ and nuts and lock nuts are applied to the bolts as shown.

If the axle $h$, is of larger diameter than the minimum diameter which the blocks $e$ have been initially turned to fit, the pulley parts are mounted in a lathe or machine and the inner surfaces of the cast iron blocks $e$ are machined by boring or turning to the appropriate diameter of bore. Similarly, if the axle has a taper or other non-cylindrical formation where the pulley is to be applied, the machining carried out upon the blocks will be such as to impart a taper or other appropriate formation to the inner faces of the blocks. For this machining, the pulley halves may be bolted together with suitable distance pieces or fillers inserted between the lugs $c'$. After this machining, which can be carried out without the necessity for any great degree of skill or precision, the pulley is ready for application and fastening to the axle in question.

The strap or hub portions $c$ permit the pulley to be bolted on to an axle differing only slightly in diameter from that referred to as a minimum diameter axle. For general utility purposes, however, the pulley must be capable of fitting on to axles differing substantially from the said minimum diameter, and in such cases the machining referred to is resorted to at the place of use, as this is generally possible seeing that machines of elementary construction can be employed for the purpose of performing this simple operation. As stated, this machining calls for no particular precision, because when the pulley is fitted and secured, the strap or hub members $c$ compensate for small inaccuracies as regards axle diameter, symmetry of axle section, shape of axle and so on.

I claim:—

1. A combined pulley and bushing comprising semi-circular pressed steel discs each having a web portion formed with an outer peripheral rim and an inner peripheral flanged edge parallel to the rim, semi-circular hub members on which the edges are mounted, a plurality of bushing blocks spaced apart on the hub members, and means countersunk in the blocks connecting the latter to the hub members and said edges.

2. A combined pulley and bushing comprising semi-circular pressed steel discs each having a web portion formed with an outer peripheral rim portion and an inner peripheral flanged edge parallel to the rim, semi-cylindrical hub members on which said edges are mounted, a plurality of metal blocks arranged in spaced relation one to the other on each hub-member, and rivets countersunk in the inner face of each block and extending through the hub member and flanged edge of the web.

FREDERICK GUY STILL.